July 18, 1944. L. ZIMMERMANN 2,353,802
POWER TRANSMISSION
Filed Dec. 12, 1940
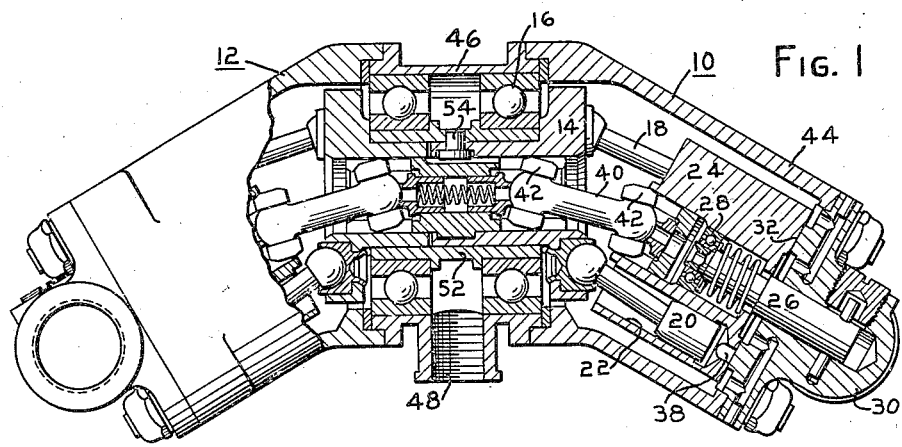
Fig. 1
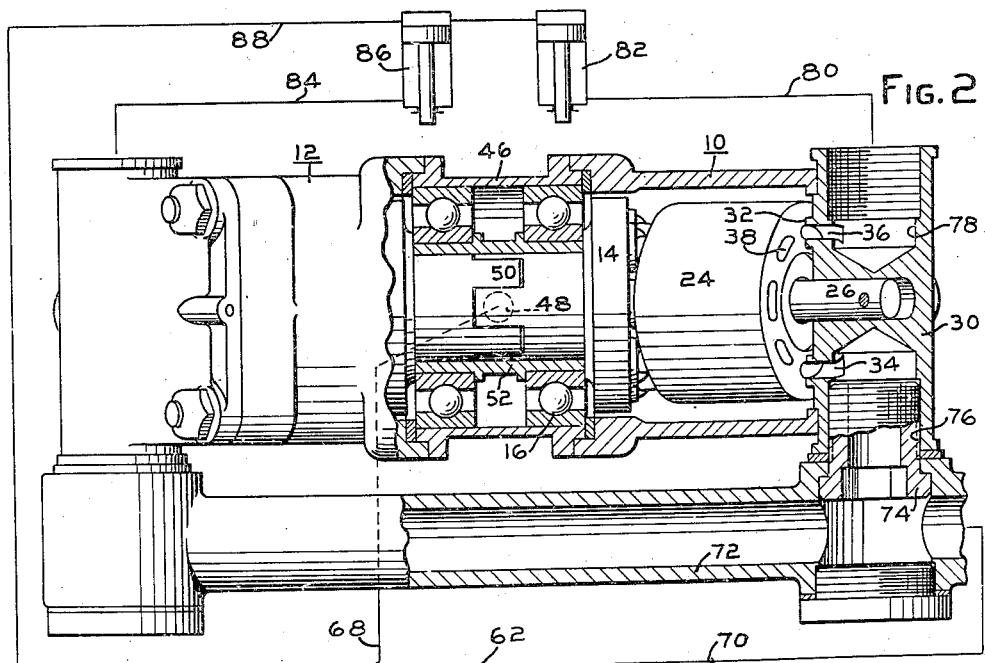
Fig. 2
INVENTOR
LUKAS ZIMMERMANN
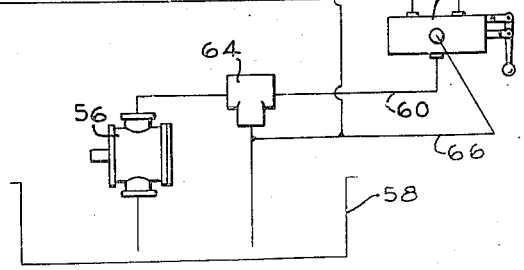
ATTORNEY.

Patented July 18, 1944

2,353,802

UNITED STATES PATENT OFFICE 2,353,802

POWER TRANSMISSION

Lukas Zimmermann, Detroit, Mich., assignor to Vickers Incorporated, Detroit, Mich., a corporation of Michigan Application December 12, 1940, Serial No. 369,813

5 Claims. (Cl. 103—1)

This invention relates to power transmissions, particularly to those of the type comprising two or more fluid pressure energy translating devices, one of which may function as a pump and another as a fluid motor.

The invention is more particularly concerned with a power transmission system having a pair of parallel-connected circuits such, for example, as the circuits of two fluid motors supplied with fluid from a single pump and wherein it is desired to operate the motors in synchronism regardless of the relative load distribution as between the two motors. In many applications of hydraulic power transmission systems, the parallel operation of two motors is desirable, but, as is well known, a simple parallel connection acts as a hydraulic differential and operates only the motor having the lightest load because the fluid delivered by the pump always seeks the path of least resistance.

One such application is the retraction and extension of landing gear aboard aircraft. Commonly such retractable landing gear is operated by two independent cylinders, one for each of the two main landing wheels. It is highly desirable that these cylinders be operated from a single pressure source and that they move in synchronism regardless of the variations in effort as between the two cylinders.

It is an object of the present invention to provide an improved flow dividing unit which may be connected in two parallel circuits operating from a single point of supply and which without significant throttling losses will serve to divide the flow equally between the two parallel circuits.

A further object is to provide a device of this nature utilizing two fluid pressure energy translating devices of the axial cylinder type and to so connect the devices mechanically as to transfer both torque and internal piston thrust from either device to the other.

Further objects and advantages of the present invention will be apparent from the following description, reference being had to the accompanying drawing wherein a preferred form of the present invention is clearly shown.

In the drawing:

Figure 1 is a side view partly in section of a flow dividing unit embodying a preferred form of the present invention.

Figure 2 is a top view partly in section of the unit illustrated in Figure 1 and showing diagrammatically a typical circuit in which the unit may be connected.

Referring now to the drawing, the flow dividing unit comprises a pair of fluid pressure energy translating devices generally designated 10 and 12, each of which is identical in construction and only one of which will be described in detail. These units may be of any suitable type, the ones illustrated being similar to the device illustrated in the Thoma Patent No. 1,931,969. Thus, each device may comprise a driving flange 14 rotatable upon anti-friction bearings 16 and having articulated thereto by ball joints a plurality of connecting rods 18 which carry articulated pistons 20 on their opposite ends.

The pistons 20 are reciprocable in cylinders 22 of a rotary cylinder barrel 24 which is journalled on a stub shaft 26 by means of an anti-friction bearing 28. The shaft 26 is mounted in a valve plate 30 having the usual annular pressure surface 32 in which the customary arcuate inlet and outlet ports 34 and 36 are provided. The cylinders 22 have cylinder ports 38 adapted to register alternately with ports 34 and 36 during the revolution of the cylinder barrel.

A Cardan shaft 40 having universal joints 42 at its opposite ends connects between the driving flange 14 and the cylinder barrel 24 to keep the two moving in synchronism.

A tubular casing 44 is bolted to the valve plate 30 and at its opposite end is provided with an angularly disposed opening by which the casing is bolted to a common intermediate housing member 46 in which the bearings 16 are supported. A suitable drain connection at 48 may be provided for draining internal leakage.

The driving flanges of the two units 10 and 12 are provided with mating serrated teeth 50 as shown in Figure 2 which couple the two driving flanges together in non-rotatable relation. Thus, the teeth provide a connection by which torque may be transferred between either driving flange 14 and the other one. Immediately surrounding these serrated portions of the flanges is a common sleeve member 52 which is dowelled to one of the flanges as at 54 and which serves to hold the flanges a predetermined distance apart. It will be seen then that the sleeve 52 provides a connection between the flanges whereby the component of piston thrust which is parallel to the axis of driving flange 14 may be transferred directly from one flange to the other or vice versa.

Figure 2 illustrates diagrammatically a typical circuit in which the flow dividing device may be connected and comprising a pump 56 adapted to withdraw oil from a tank 58 delivering it through a delivery line 60 to a conventional four-way reverse valve 62. The usual relief valve 64 may be provided for bypassing the pump delivery to tank whenever a predetermined pressure is exceeded in the line 60. The tank return port of valve 62 is connected to tank by a conduit 66 having a branch 68 extending to the drain port 48 of the flow dividing device.

One of the cylinder ports of valve 62 is connected by a conduit 70 with the inlet port 34 of both devices 10 and 12. Conveniently this connection may be provided by means of a manifold 72 which is bolted by means of hollow sleeves 74 to each of the inlet ports 76 of the devices 10 and 12. The outlet port 78 of the right hand device connects by a conduit 80 with the lower end of a fluid motor represented by a piston and cylinder 82. Similarly, the outlet port 78 of the device 12 connects by a conduit 84 with a motor 86. The opposite ends of motors 82 and 86 may be connected in parallel by means of a conduit 88 which leads to the other port of the reverse valve 62.

In operation, with the pump 56 running, if it is desired to move the pistons of motors 82 and 86 upwardly, the valve 62 may be shifted to direct pressure fluid from conduit 60 to conduit 70 where it flows to manifold 72 and inlet port 76 of both devices.

Assuming for simplicity that the piston displacement of devices 10 and 12 is made equal and likewise that the displacement of motors 82 and 86 is equal and that they are desired to be moved at equal speeds, it will be seen that the fluid flowing in through inlet port 34 of each device will build up pressure on each of the pistons 20 which is in communication with the inlet port, and, due to the angular relation between the axis of barrel 24 and flange 14, the barrel and flange will start rotating in a counterclockwise direction as to the unit 10 in Figure 2. The same action takes place at the unit 12, and the rotation will be in the same direction, although, in the position illustrated in Figure 2, this rotation would appear as clockwise.

During this rotation the pistons move out of the cylinder bores while the cylinders are in communication with inlet port 34, and likewise, while they are in communication with outlet port 36, the pistons will move back into the cylinders, thus discharging oil to the outlet port 78 and through conduit 80 to the motor 82. Since the devices 10 and 12 are of equal displacement and since their driving flanges are non-rotatably connected together, it will be seen that equal quantities of oil will be passed through each device, thus pushing equal quantities of fluid into the lower end of motors 82 and 86. Accordingly, the pistons thereof will move upwardly in synchronism, discharging oil from the upper end through conduit 88 and back through valve 62 and conduit 66 to tank.

Should the load on the motor 82, for example, be in excess of that on the motor 86, a higher pressure will build up in conduit 80 than in conduit 84. This pressure will be reflected back through the device 10 to the inlet port 76 and, since this is in free communication through manifold 72 with the inlet port of unit 12, the same higher pressure will be imposed on the inlet of unit 12. This higher pressure will not be transmitted to conduit 84, however, because a portion of that pressure will be converted into torque applied to the driving flange of unit 12 and in turn transmitted to the driving flange of unit 10. This in turn raises the pressure in the outlet port 78 so that the net effect is that the pressure in inlet manifold 72 will become stabilized at a point midway between the pressure in conduit 80 and the pressure in conduit 84.

In other words, as the fluid passes through unit 10, its outlet pressure is raised by torque applied from the unit 12. Likewise, in passing through the unit 12 the outlet pressure is reduced by the transfer of torque from unit 12 to unit 10. Regardless of the pressure differences, however, between conduits 80 and 84, the rate of flow therethrough will be equal at all times because the same quantity of fluid which passes through unit 10 must also pass through unit 12 since they are mechanically coupled together.

Should it be desired to reverse the motion of the pistons of motors 82 and 86, the valve 62 may be shifted to its opposite position in which fluid is directed from delivery conduit 60 to conduit 88 and the upper end of the motors. The oil exhausting from the motors is carried separately to the ports 78 of the units 10 and 12 which now become inlet ports and is exhausted through the ports 76, to manifold 72, conduit 70, valve 62 and conduit 66 to tank.

The synchronizing action under these conditions is analogous to that previously described, the difference being that that motor which is under the least resisting load has an additional back pressure imposed on the lower end of the cylinder which pressure is caused by one device of the flow dividing unit building up torque to drive the other device thereof. This action is limited, however, by the amount of back pressure imposed on manifold 72 by resistance between it and the tank.

It will be noted that the present construction permits the use of considerably lighter bearings than are necessary in a single unit fluid pressure energy translating device for the reason that the component of piston thrust parallel to the axis of the driving flange of unit 10 is substantially cancelled out by the opposite component transmitted from the flange of unit 12 through the sleeve 52. In this way the bearings 16 need only carry the radial load on the driving flanges 14 and may thus be considerably lighter than would otherwise be necessary.

While the form of embodiment of the invention as herein disclosed constitutes a preferred form, it is to be understood that other forms might be adopted, all coming within the scope of the claims which follow.

What is claimed is as follows:

1. A fluid regulating device for proportioning flow through a pair of conduits connected in parallel, comprising a pair of rotary fluid pressure energy translating devices of the type having a drive member, a plurality of axially positioned cylinders, pistons reciprocable therein, and motion converting means for converting reciprocation of the pistons into rotation of the drive member, each device having a pair of connection ports constituting an inlet and outlet for the device, means forming a conduit connecting one port of each pair, the other ports of each pair being isolated from each other, a housing forming a mounting for said devices with their drive members adjacent to and in alignment with each other, and means connecting said drive members, said last means transferring both torque and thrust from either to the other of said drive members.

2. A fluid regulating device for proportioning flow through a pair of conduits connected in parallel, comprising a pair of rotary fluid pressure energy translating devices of the type having a rotatable cylinder barrel with axial cylinders, a driving flange rotatable on an axis inclined to that of the barrel and connecting rods articulated to the flange and to pistons reciprocable in the cylinders, each device having a pair of connection ports constituting an inlet and outlet for the device, means forming a conduit connecting one port of each pair, the other ports of each pair being isolated from each other, a housing forming a mounting for said devices with their driving flanges in coaxial alignment, and means connecting said driving flanges for conjoint rotation.

3. A fluid regulating device for proportioning flow through a pair of conduits connected in parallel, comprising a pair of rotary fluid pressure energy translating devices of the type having a rotatable cylinder barrel with axial cylinders, a driving flange rotatable on an axis inclined to that of the barrel and connecting rods articulated to the flange and to pistons reciprocable in the cylinders, each device having a pair of connection ports constituting an inlet and outlet for the device, means forming a conduit connecting one port of each pair, the other ports of each pair being isolated from each other, a housing forming a mounting for said devices with their driving flanges in coaxial alignment, and means forming a non-rotatable connection between said flanges and adapted to transfer thrust from either flange to the other independently of the housing.

4. A fluid regulating device for proportioning flow through a pair of conduits connected in parallel, comprising a pair of rotary fluid pressure energy translating devices of the type having a rotatable cylinder barrel with axial cylinders, a driving flange rotatable on an axis inclined to that of the barrel and connecting rods articulated to the flange and to pistons reciprocable in the cylinders, each device having a pair of connection ports constituting an inlet and outlet for the device, means forming a conduit connecting one port of each pair, the other ports of each pair being isolated from each other, a housing forming a mounting for said devices with their driving flanges in coaxial alignment, anti-friction bearings for said drive flanges and substantially smaller than necessary to carry the full thrust of piston reaction, and a sleeve member mounted between and rotatable with said flanges for carrying the thrust from either member to the other.

5. A fluid regulating device for proportioning flow through a pair of conduits connected in parallel, comprising a pair of rotary fluid pressure energy translating devices of the type having a drive member, a plurality of axially positioned cylinders, pistons reciprocable therein, and motion converting means for converting reciprocation of the pistons into rotation of the drive member, each device having a pair of connection ports constituting an inlet and outlet for the device, means forming a conduit connecting one port of each pair, the other ports of each pair being isolated from each other, a housing forming a mounting for said devices with their drive members adjacent to and in alignment with each other, and means connecting said drive members.

LUKAS ZIMMERMANN.